US009652295B2

(12) United States Patent
Barsness et al.

(10) Patent No.: US 9,652,295 B2
(45) Date of Patent: *May 16, 2017

(54) RUNTIME FUSION OF OPERATORS BASED ON PROCESSING ELEMENT WORKLOAD THRESHOLD AND PROGRAMMING INSTRUCTION COMPATIBILITY

(71) Applicant: International Business Machines Corporation, Armonk, NY (US)

(72) Inventors: Eric L. Barsness, Pine Island, MN (US); Michael J. Branson, Rochester, MN (US); John M. Santosuosso, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 28 days.

This patent is subject to a terminal disclaimer.

(21) Appl. No.: 14/751,497

(22) Filed: Jun. 26, 2015

(65) Prior Publication Data
US 2016/0378566 A1 Dec. 29, 2016

(51) Int. Cl.
*G06F 9/50* (2006.01)
*H04L 12/24* (2006.01)
(Continued)

(52) U.S. Cl.
CPC ........ *G06F 9/5083* (2013.01); *H04L 41/5054* (2013.01); *H04L 67/1008* (2013.01);
(Continued)

(58) Field of Classification Search
CPC ...... G06F 9/44; G06F 9/5083; G06F 9/44505; G06F 9/505; G06F 9/5055; H04L 41/50; H04L 67/1008; H04L 41/5054
See application file for complete search history.

(56) References Cited

U.S. PATENT DOCUMENTS 8,560,527 B2 * 10/2013 Santosuosso ....... H04L 67/1097
707/720
9,075,662 B2 * 7/2015 Gedik ................... G06F 9/5066
(Continued)

OTHER PUBLICATIONS

Hirzel et al. "A Catalog of Stream Processing Optimizations," ACM Computing Surveys, vol. 46, No. 4, Article 46, Publication date: Mar. 2014.*

(Continued)

*Primary Examiner* — Benjamin Wu
(74) *Attorney, Agent, or Firm* — Michael Purdham

(57) ABSTRACT

The streams environment includes a plurality of operators coupled with processing elements including a first processing element coupled with a first operator instructed with a first programming instructions, and a second processing element coupled with a second operator instructed with a second programming instructions. A workload of the first processing element and a workload of the second processing element are measured. A first threshold of the workload of the first processing element, and second threshold of the workload of the second processing element are determined. The first programming instructions and the second programming instructions are compared to determine if the first operator and the second operator are susceptible to fusion. The first operator is de-coupled and fused to the second processing element, in response to determining the first threshold and the determination that the first operator and the second operator are susceptible to fusion.

16 Claims, 8 Drawing Sheets

(51) Int. Cl.
  *H04L 29/08* (2006.01)
  *G06F 9/445* (2006.01)
(52) U.S. Cl.
  CPC .......... *G06F 9/44505* (2013.01); *G06F 9/505* (2013.01); *G06F 9/5055* (2013.01)

(56) References Cited

U.S. PATENT DOCUMENTS

| | | | | |
|---|---|---|---|---|
| 9,218,395 | B2* | 12/2015 | Barsness | G06F 17/30516 |
| 9,262,478 | B2* | 2/2016 | Branson | G06F 17/30516 |
| 9,391,831 | B2* | 7/2016 | Branson | H04L 29/08135 |
| 9,473,550 | B2* | 10/2016 | Branson | H04L 65/60 |
| 9,514,159 | B2* | 12/2016 | Barsness | G06F 17/30289 |
| 9,531,648 | B2* | 12/2016 | Branson | H04L 49/9084 |
| 9,535,763 | B1* | 1/2017 | Cook | G06F 9/4868 |
| 2005/0114862 | A1* | 5/2005 | Bisdikian | G06F 9/5083 718/105 |
| 2009/0319687 | A1* | 12/2009 | Goldstein | G06F 9/5083 709/241 |
| 2010/0293535 | A1 | 11/2010 | Andrade et al. | |
| 2012/0179809 | A1* | 7/2012 | Barsness | G06F 17/30516 709/224 |
| 2012/0204187 | A1* | 8/2012 | Breiter | G06F 9/5072 718/105 |
| 2013/0054779 | A1 | 2/2013 | Cradick et al. | |
| 2013/0080652 | A1 | 3/2013 | Cradick et al. | |
| 2013/0111467 | A1* | 5/2013 | Sundararaj | G06F 9/505 717/176 |
| 2013/0198489 | A1 | 8/2013 | Branson et al. | |
| 2013/0290969 | A1* | 10/2013 | Branson | G06F 9/48 718/102 |
| 2013/0346446 | A9* | 12/2013 | Jimenez Peris | G06F 9/5066 707/774 |
| 2014/0101668 | A1* | 4/2014 | Gedik | G06F 9/5083 718/105 |
| 2014/0122559 | A1* | 5/2014 | Branson | H04L 67/02 709/201 |
| 2014/0136176 | A1* | 5/2014 | Branson | G06F 11/34 703/13 |
| 2014/0136723 | A1* | 5/2014 | Branson | H04L 67/322 709/231 |
| 2014/0136724 | A1* | 5/2014 | Branson | H04L 67/322 709/231 |
| 2014/0215041 | A1* | 7/2014 | Mann | H04L 41/50 709/223 |
| 2014/0310259 | A1* | 10/2014 | Tian | G06F 17/30545 707/718 |
| 2015/0100592 | A1* | 4/2015 | Balikov | G06F 9/5066 707/752 |
| 2015/0295970 | A1* | 10/2015 | Wang | H04L 65/4092 709/231 |

OTHER PUBLICATIONS

Barsness et al., "Runtime Fusion of Operators," U.S. Appl. No. 14/869,529, filed Sep. 29, 2015.

List of IBM Patents or Patent Applications Treated as Related, signed Sep. 28, 2015, 2 pages.

Gedik et al., "A Model-Based Framework for Building Extensible, High Performance Stream Processing Middleware and Programming Language for IBM InfoSphere Streams", Software-Practice and Experience, 2010, pp. 1-40, 00:1, Copyright © 2010 John Wiley & Sons, Ltd.

IBM, "Dynamic Kernal Fusion", an IP.com Prior Art Database Technical Disclosure, IP.com No. 000187593, pp. 1-4, Sep. 11, 2009. http://null/IPCOM/000187593.

Rea, R., "IBM InfoSphere Streams: Redefining real-time analytics processing", IBM Software, Thought Leadership White Paper, Document No. IMW14704USEN, May 2013, pp. 1-14, (web page pp. 1-3).

* cited by examiner

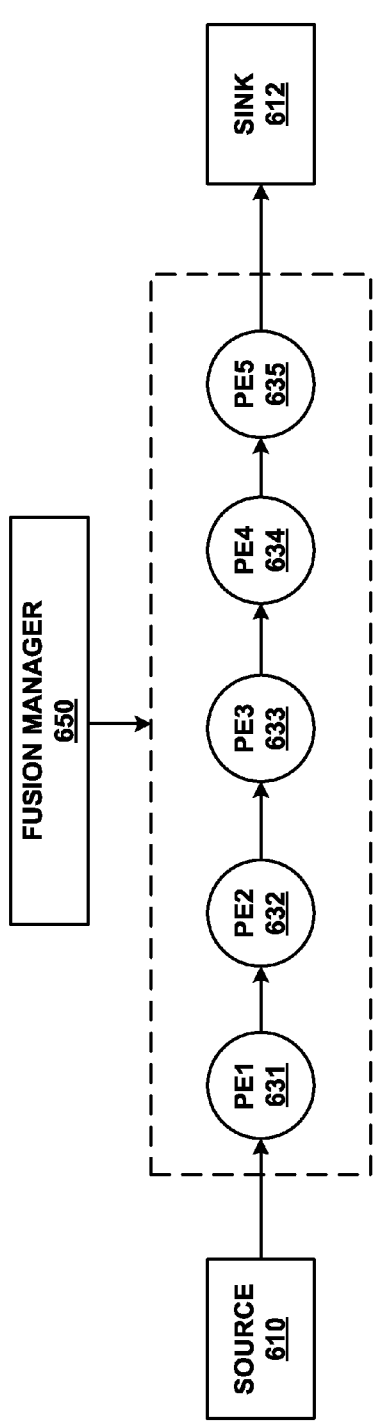
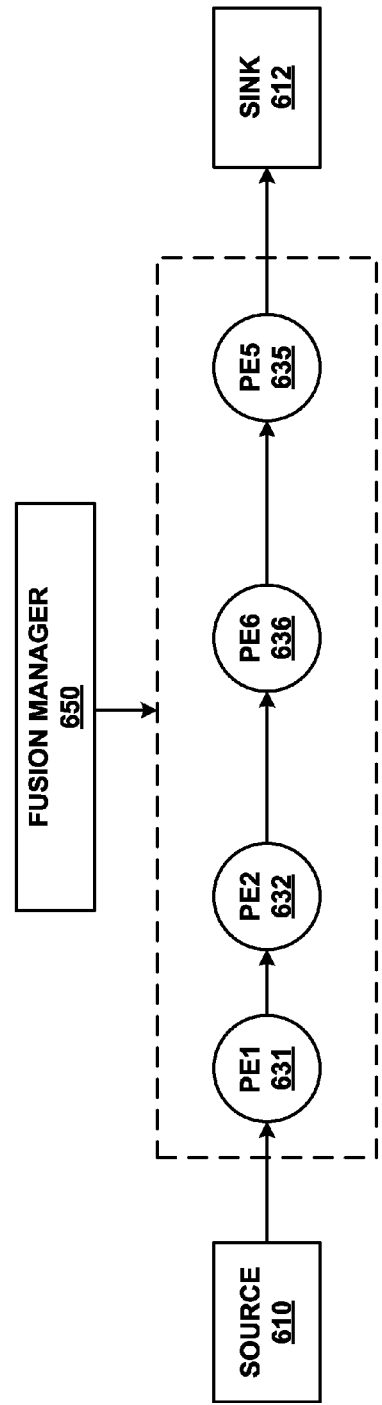

RUNTIME FUSION OF OPERATORS BASED ON PROCESSING ELEMENT WORKLOAD THRESHOLD AND PROGRAMMING INSTRUCTION COMPATIBILITY

BACKGROUND

This disclosure generally relates to stream computing, and in particular, to computing applications that receive streaming data and process the data as it is received.

Database systems are typically configured to separate the process of storing data from accessing, manipulating, or using data stored in a database. More specifically, database systems use a model in which data is first stored and indexed in a memory before subsequent querying and analysis. In general, database systems may not be well suited for performing real-time processing and analyzing streaming data. In particular, database systems may be unable to store, index, and analyze large amounts of streaming data efficiently or in real time.

SUMMARY

Embodiments of the disclosure provide a method, system, and computer program product for processing data. The method, system, and computer program product receive two or more tuples to be processed by a plurality of processing elements operating on one or more computer processors.

One embodiment provides a method for determining a fusion of two or more operators. The streams environment includes one or more computer processors. The streams environment includes a plurality of operators coupled with processing elements including a first processing element coupled with a first operator instructed with a first programming instructions, and a second processing element coupled with a second operator instructed with a second programming instructions. A workload of the first processing element and a workload of the second processing element are measured. A first threshold of the workload of the first processing element, and second threshold of the workload of the second processing element are determined. The first programming instructions and the second programming instructions are compared to determine if the first operator and the second operator are susceptible to fusion. The first operator is de-coupled and fused to the second processing element, in response to determining the first threshold and the determination that the first operator and the second operator are susceptible to fusion.

Another embodiment is directed toward a system for determining the fusion of a plurality of operators within a streaming environment. The system includes a memory, and a processor device communicatively coupled to the memory. The streams manager is configured to monitor the plurality of operators within the streams environment. The streams manager is configured to monitor the streams environment including a plurality of operators coupled with processing elements including a first processing element coupled with a first operator instructed with a first programming instructions, and a second processing element coupled with a second operator instructed with a second programming instructions. The streams manager is configured to measure a workload of the first processing element and a workload of the second processing element. The streams manager is configured to determine a first threshold of the workload of the first processing element, and second threshold of the workload of the second processing element are determined. The streams manager is configured to determine if the first operator and the second operator are susceptible to fusion by comparing the first programming instructions and the second programming instructions. The streams manager is configured to de-couple and fuse the first operator to the second processing element, in response to determining the first threshold and the determination that the first operator and the second operator are susceptible to fusion.

Yet another embodiment is directed toward a computer program product for determining the fusion of a plurality of operators within a streaming environment. The computer program product is configured to monitor the plurality of operators within the streams environment. The computer program product is configured to monitor the streams environment including a plurality of operators coupled with processing elements including a first processing element coupled with a first operator instructed with a first programming instructions, and a second processing element coupled with a second operator instructed with a second programming instructions. The computer program product is configured measure a workload of the first processing element and a workload of the second processing element. The computer program product is configured to determine a first threshold of the workload of the first processing element, and second threshold of the workload of the second processing element are determined. The computer program product is configured to determine if the first operator and the second operator are susceptible to fusion by comparing the first programming instructions and the second programming instructions. The computer program product is configured to de-couple and fuse the first operator to the second processing element, in response to determining the first threshold and the determination that the first operator and the second operator are susceptible to fusion.

BRIEF DESCRIPTION OF THE DRAWINGS

FIG. 6A illustrates an operator graph of plurality of processing elements within a streams environment, according to various embodiments.

FIG. 6B illustrates an operator graph where two processing elements each with a plurality of operators have fused operators into one processing element containing the plurality of operators, according to various embodiments.

Figure 1:
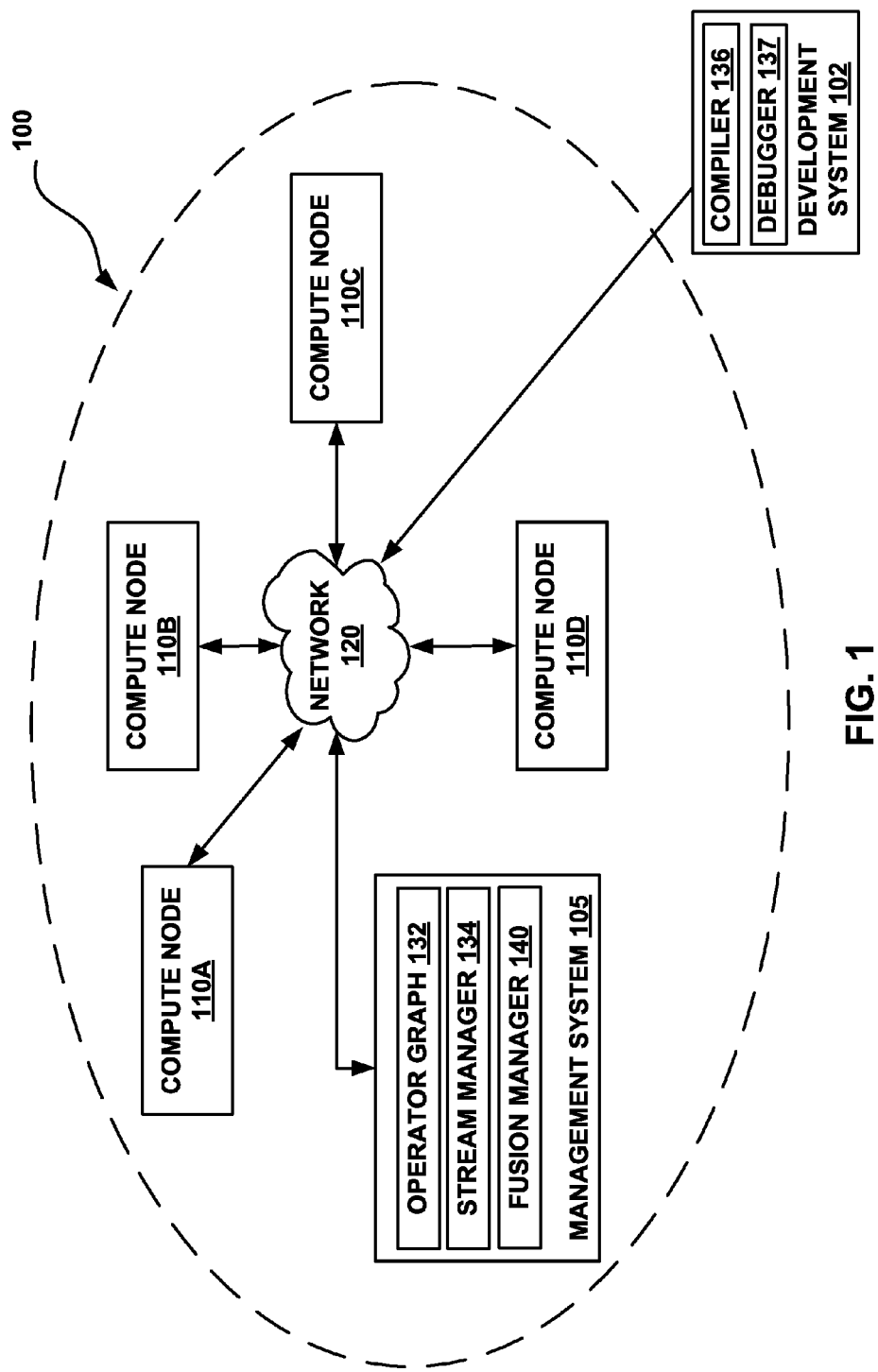
FIG. 1 illustrates a computing infrastructure configured to execute a stream computing application, according to various embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to a streams environment, more particular aspects relate to runtime fusion of two or more operators. While the present disclosure is not necessarily limited to such applications, various aspects of the disclosure may be appreciated through a discussion of various examples using this context.

Stream-based computing and stream-based database computing are emerging as a developing technology for database systems. Products are available that allow users to create applications that process and query streaming data before it reaches a database file. With this emerging technology, users may specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream computing application, stream operators are connected to one another such that data flows from one stream operator to the next (e.g., over a TCP/IP socket). When a stream operator receives data, it may perform operations, such as analysis logic, which may change the tuple by adding or subtracting attributes, or updating the values of existing attributes within the tuple. When the analysis logic is complete, a new tuple is then sent to the next stream operator. Scalability is achieved by distributing an application across nodes by creating executables (i.e., processing elements), as well as replicating processing elements on multiple nodes and load balancing among them. Stream operators in a stream computing application may be fused together to form a processing element that is executable. Doing so allows processing elements to share a common process space, resulting in much faster communication between stream operators than is available using inter-process communication techniques (e.g., using a TCP/IP socket). Further, processing elements may be inserted or removed dynamically from an operator graph representing the flow of data through the stream computing application. A particular stream operator may not reside within the same operating system process as other stream operators. In addition, stream operators in the same operator graph may be hosted on different nodes, e.g., on different compute nodes or on different cores of a compute node.

A compute node may include a computer processor. The computer processor may operate along with one or more other computer processors, forming a grouping. The grouping of two or more computer processors may be termed as a cluster, e.g., a server containing one or more computer processors, on which the streams environment operates.

Data flows from one stream operator to another in the form of a "tuple." A tuple is a sequence of one or more attributes associated with an entity. Attributes may be any of a variety of different types, e.g., integer, float, Boolean, string, etc. The attributes may be ordered. In addition to attributes associated with an entity, a tuple may include metadata, i.e., data about the tuple. A tuple may be extended by adding one or more additional attributes or metadata to it. As used herein, "stream" or "data stream" refers to a sequence of tuples. Generally, a stream may be considered a pseudo-infinite sequence of tuples.

Tuples are received and output by stream operators and processing elements. An input tuple corresponding with a particular entity that is received by a stream operator or processing element, however, may be changed by the stream operator, even if the output tuple corresponds with the same entity or data as the input tuple. An output tuple need not be changed in some way from the input tuple.

Nonetheless, an output tuple may be changed in some way by a stream operator or processing element. An attribute or metadata may be added, deleted, or modified. For example, a tuple will often have two or more attributes. A stream operator or processing element may receive the tuple having multiple attributes and output a tuple corresponding with the input tuple. The stream operator or processing element may only change one of the attributes so that all of the attributes of the output tuple, except one, are the same as the attributes of the input tuple.

Generally, a particular tuple output by a stream operator or processing element may not be considered to be the same tuple as a corresponding input tuple even if the input tuple is not changed by the processing element. However, the run environment of the present description and the claims, may include an output tuple that has the same data attributes or is associated with the same entity as a corresponding input tuple which will be referred to herein as the same tuple unless the context or an express statement indicates otherwise.

Streams environments may include a distributed programming paradigm where an application may be split up into pieces. The pieces of the application may be distributed across a series of processing elements. The series of processing elements may run on one or more computer processors within a cluster of the streams environment. The processing elements may be connected together by sending streams of data or tuples into and out of an initial processing element to a subsequent processing element. The stream may include a series of tuples each of which may have attributes. The tuples may enter the processing elements one tuple at a time. Contracts may exist between processing elements to which processing elements who sends the tuples and which processing elements receive tuples. The stream of tuples may be introduced continuously, (i.e. never ending) the processes main thread code may include a call back routine that executes when tuples arrive at any of the incoming ports.

The processing elements of the streams environment may include a plurality of operators configured to perform various tasks upon the tuples. The plurality of operators may be grouped together to form a processing element that performs the task as a whole using the plurality of operators. Alone, an operator may perform a single task upon a tuple, whereas if the operators are grouped together, multiple tasks may be completed by a single processing element in tandem. For example, two operators may operate within a single processing element. The two operators may perform two tasks or operations upon the tuple simultaneously while the tuple is within the single processing element.

Operator graphs may include one or more processing elements aligned to perform a function upon one or more tuples as the tuples pass through the stream environment. Operator graphs may be basic or complex. Basic operator graphs may include a few operators configured to perform a simple task. For example, a basic operator graph may include three processing elements. The three processing elements may include a source, a functor, and a sink. The source may input tuples into the stream, the functor may perform an operation upon the tuples sent from the source, and the sink may output the tuples from the stream. The source may read external data from a file or socket using a uniform resource identifier (URI). For example, the source may read external data from a first disk and pass the data in a form of tuples read from the disk to the functor. The functor may perform a manipulation or transformation operation, where an attribute of a tuple may be changed. The functor may be a processing element. The processing element may perform an operation upon the tuple, described further herein. The sink may intake the tuple, write the tuple, and externalize the tuple onto a desired output format. For example, the sink may write the tuple to a disk, the tuple may include the data transformed by the functor. The data can be externalized and displayed on a graphical user interface (GUI) observable by an end user.

Operator graphs may also be complex. Complex operator graphs may include one or more processing elements, operating on one or more tuples, within the streams environment. For example, the operator graph may include a split operator. The split operator may copy the tuples to run the split tuples in tandem within separate processing elements. For example, a first tuple is split into a first tuple and a copy of the first tuple. The first tuple may enter a first set of one or more processing elements within the operator graph, and the copy of the first tuple may enter a second set of one or more processing elements within the operator graph. The first set of one or more processing elements may perform a first set of operations upon the first tuple, while the second set of one or more processing elements may perform a second set of operations upon the copy of the first tuple.

Each operator may turn into a processing element and include a separate process compared to other operators. Having each operator operate upon individual processing elements may spread out the workload, using one or more computer processors, within the streams environment. The one or more computer processors may operate within a cluster of computer processors that are configured to run the streams environment. The processing elements including a single operator may not utilize available processing power within the computer processor depending upon the operator and the computer processor utilized by the operator. To increase the efficiency of the processing power available within the cluster of computer processors, operators may be fused alongside other operators within a single processing element.

Operators may include code that instructs the operators to perform actions upon tuples as they pass though the operators. The code may be written using a particular programming language to create program instructions for the operators. The operators may be combined into processing elements that use the computers processors of the streams environment to perform the operations upon the tuples. One or more operators may be programmed or grouped to a single processing element, causing a single processing element to be able to perform multiple tasks or operations. To process the tuples, the one or more processing elements require processing power of the one or more computer processors of the cluster. If the one or more operators do not require all of the processing power available from a computer processor, then additional operators may be fused to the processing element. Fusing an additional operator to a processing element may better utilize the processing power of the computer processor.

In various embodiments, the programming instructions of the operator may also include instructions on fusion. The fusion instructions may include a determination if an operator is susceptible to fusion. Fusion susceptibility may include whether or not the operator may fuse within any other operator, which one or more operators the operator may fuse, or which one or more operators the operator may not fuse. The instructions for fusion will be described further herein. In determining if the fusion of two operators may be possible, a fusion manager may use the programming instructions to determine if the two operators a susceptible to fusion used interchangeably with susceptibility to fusion further herein. For example, the fusion manager may compare a fusion compatibility of a first operator and a second operator. Programming instructions of the first operator and Programming instructions of the second operator may be compared as a fusion compatibility. If the programming instructions of the first operator and the programming instructions of the second operator are compatible, then the first operator and the second operator may be fused together on a processing element.

In various embodiments, the fusion of two or more operators may be determined by a class (i.e. type) of the operators. The class of the operator may be included within the programming instructions of the operators. If two operators are the same class, then they may be fused. A first operator with a first class may be able to fuse with a second operator with the first class. The class of the programming instructions may include sorting the types of operators into groups that preform a similar function. For example, two filter operators may be the same class because they both preform a filtering operation. The two filter operators may be fused together because they are the same operator class.

The streams environment including the operator graph may also include a fusion manager. The fusion manager may fuse together two or more operators included within two or more processing elements into a single processing element. The fusion manager may be a streams profiler that monitors the workload of the processing elements within the stream. The fusion manager may also be communicatively coupled with a streams manager that performs various functions on the streams environment. For example, the single processing element may include a single executable or deployable piece of code. The single executable may take up the single processing element. The reduction of the two or more processing elements running may increase the performance of the streams environment. The performance perspective may include the processing power of the one or more computer processors within the cluster. For example, reducing the number of processing elements may reduce the number of computer processors that are used to send data in and out of the processing elements. The one or more processing elements may communicate over transmission control protocol/internet protocol (TCP/IP) by ordering attributes from one processing element to another. If the one or more operators are fused then the communications between the operators may be similar to a "function call" in computer programming.

Fusion information may be located within sections of the programming instructions or code. The programming instructions may be used by the fusion manager to determine fusion points. The fusion of the operators may be determined by the fusion manager and may be used to determine an increase or decrease in efficiency of the stream by fusing a plurality of operators. However, performing the determination during compile time may include limitations. An example of a limitation may include, without doing runtime analysis, the fusion manager may have a decreased understanding of the location of the operators within the processing elements within the stream. Whereas if the determination of the fusion points is performed during run time, may allow the fusion manager to locate the operators within the processing elements, and monitor the current efficiency of the processing elements.

Although the combination of multiple operators within a single processing element may decrease the amount of computer processors of the cluster needed to operate the streams environment, loading all of the operators onto a single processing element may overload the computer processors. To prevent a computer processor from becoming overloaded, the operators may be balanced. To determine if a computer processor is overloaded, an upper threshold may be used. For example, if five operators exist within the operator graph each of the five operators may contain various tasks. Of the five operators, operators that are similarly tasked may be grouped upon a single processing element, and operators that are specifically tasked may remain on their own processing element. In an example, three of the five operators are similarly tasked and two of the operators are specifically tasked. If the first operator, the third operator, and the fourth operator are similarly tasked and able to be grouped, then they may be grouped onto the first processing element as long as first processing element does not require too much processing power. The second operator may be placed on a second processing element, and the fifth operator may be placed upon a third processing element. A maximum throughput or speed of processing of the data stream may be determined by how much processing power the processing element requires, or how efficiently the operators are distributed upon the processing elements.

A limitation of fusing a plurality of operators may include too many operators of a processing element running on a single computer processor. To prevent a computer processor from being overloaded, a streams manager may monitor the stream in real time. The streams manager may communicate with the fusion manager. The fusion manager may analyze the code of the operators as the operators perform operations upon the tuples. The fusion manager may also fuse operators from a first processing element to a second processing element to reduce the overall number of processes running on a given computer processor without changing an end result of the stream. By reducing the amount of processing elements, more jobs may executed on a single computer processor without overburdening the system.

The streams manager may perform a runtime analysis of the current operations running within the streams environment. The runtime analysis may include monitoring the plurality of operators of a processing element. The operators may perform operations upon tuples within the streams environment. The streams manager may use information gathered by monitoring the processing element to determine if fusion of an operator with the plurality of operators of the processing element may be done.

To prevent the computer processors from being overloaded or underloaded, a plurality of operators may be fused or transferred from a first processing element to a second processing element. Code or programming instructions within the operators may be used to determine which operators may be fused together within the same processing element. A way to increase the efficiency of the operator graph may include reducing the amount of processing elements within the stream, which may decrease the amount of transfers from a processing element to another processing element. For example, one data stream has ten processing elements with one hundred operators, and another stream has five processing elements with the same one hundred operators. The stream with five processing elements may have a shorter processing time of the stream because of the reduction of the number of transfers from processing element to processing element.

To prevent a computer processor from being overloaded or underloaded, thresholds may be incorporated. An upper threshold may be placed upon a workload of a processing element to prevent the computer processor running the processing element from being overloaded. For example, more than one operators may be operating upon a first processing element. If the combined workload of the plurality of operators within the processing element reaches the upper threshold, then the processing element may be overloaded. A lower threshold may be placed upon the workload of the processing element to prevent the computer processor running the processing element from being underloaded. For example, more than one operators may be operating upon a first processing element. If the combined workload of the plurality of operators within the processing element reaches the lower threshold, then the processing element may be underloaded. Thresholds relating to the workload of processing elements will be described further herein.

The workload may contain runtime statistics of the processing element. Runtime statistics may include the workloads of the operators within the processing element. Runtime statistics may be used to display the workload to the operators, and be stored as historical information. The historical information may include the previous operations the processing element performed. The historical information may include the previous fusion of the operators within the processing element. For example, the runtime statistics can be stored of a first processing element. The first processing element may contain a first operator and a second operator that were fused. The first processing element may include the historical information of the first operator and the second operator. The workload of the first operator and the workload of the second operator can be combined and future workloads of the first operator and second operator can be recorded.

The applications running within the streams environment may be monitored to determine if one or more operators may be fused together. To determine if the one or more operators may be fused, throughput times may be used. The throughput times may include the movement of tuples throughout the streams environment. If an operator is slowing down a processing time of a processing element, then the operator may be placed elsewhere within the streams environment. For example, if first operator is slowing down the processing time of a first processing element the first operator may be de-coupled from the first processing element. The first operator may then be fused with a second processing element, or the first operator may be made into a singular second processing element, where the singular second processing element only contains the first operator.

In various embodiments, the fusion manager may monitor processing elements after fusion. The fusion manager may monitor the one or more processing elements that were involved in the fusion and determine if the fusion was successful or unsuccessful. A successful fusion could include completing the intended result based on the reason for originally fusing the one or more operators. For example, a first operator may be fused to a second processing element because the workload of the first processing element originally containing the first operator was overloaded. If the fusion of the first operator to the second processing element decreased the workload of the first processing element, then the fusion may be deemed successful. An unsuccessful fusion could include not completing the intended result based on the reason for originally fusing the one or more operators. For example, a first operator may be fused to a second processing element because the workload of the first processing element originally containing the first operator was overloaded. If the fusion of the first operator to the second processing element increased the workload of the first processing element, then the fusion may be deemed unsuccessful.

In various embodiments, the fusion manager may store history of previous runs on the application of the streams environment. The history of previous runs may include the workloads of one or more operators within the operator graph of the streams environment. The workloads of the plurality of operators may be gathered by the processing element within the streams environment and displayed upon a GUI. The history of the workloads of the plurality of operators may be used to determine fusion points of the plurality of operators within one or more processing elements. The history of the workloads may be used by the fusion manager or an end user to determine fusion points of the operators.

In various embodiments, the fusion of one or more operators may be used to decrease the overall workload of the stream environment. The fusion of the one or more operators may free up computer processor space within the cluster of the streams environment. If one or more operators are fused onto a single processing element the amount of computer processors being operated upon by the streams environment may be decreased, reducing the required processing power of the stream. For example, a first processing element and a second processing element each running on a separate computer processor are fused. The first processing element leaves a first computer processor the first processing element is running on, and fuses with the second processing element on a second computer processor. The first computer processor may no longer be running a processing element.

In various embodiments, the fusion one or more operators may be used to decrease the workload of a single processing element. The fusion of one or more operators of two different processing elements may decrease the workload of at least one of the processing elements. Processing elements requiring more processing power than others may be considered overloaded when compared to other processing elements. For example, a first processing element may require an increased amount or more processing power when compared to a second processing element. The first processing element may contain one or more operators that are able to be transferred to the second processing element. The one or more operators may be transferred from the first processing element to the second processing element. After decreasing the amount of operators within the first processing element, the first processing element may require less processing power than previously.

In various embodiments, the fusion one or more operators may be used to increase the workload of a single processing element. The fusion of operators of two processing elements may increase the workload of one of the processing elements. Processing elements requiring less processing power than others may be considered underloaded when compared to other processing elements. For example, a first processing element may require a decreased amount of processing power compared to a second processing element. If the first processing element contains one or more operators that contain the programming instructions to be transferred to the second processing element, then the one or more operators may be transferred from the first processing element to the second processing element. After increasing the amount of operators within the second processing element, the second processing element may require more processing power than originally.

In various embodiments, an operator within a processing element may be configured to not fuse with another operator and the configuration of the operator may not allow a subsequent operator to perform an action alongside the operator. For example, a split operator operating as a processing element may not fuse with another operator unless the split processing element is programmed to do so. Because the split processing element may be configured to split a single tuple into two tuples, the operators required to perform the split operation may be within the split processing element. If the split processing element was coded to fuse with operators containing a certain programming instructions, then unless an operator has the certain programming instructions, the split processing element may not join with the operator.

FIG. 1 illustrates one exemplary computing infrastructure 100 that may be configured to execute a stream computing application, according to some embodiments. The computing infrastructure 100 includes a management system 105 and two or more compute nodes 110A-110D—i.e., hosts—which are communicatively coupled to each other using one or more communications networks 120. The communications network 120 may include one or more servers, networks, or databases, and may use a particular communication protocol to transfer data between the compute nodes 110A-110D. A development system 102 may be communicatively coupled with the management system 105 and the compute nodes 110 either directly or via the communications network 120.

The management system may include an operator graph 132, a stream manager 134, and a fusion manager 140. The operator graph 132 may include the instructions of the ordering of a plurality of processing elements of the streams environment. The operator graph 132 may order the plurality of processing elements based on the function of the streams environment. The stream manager 134 may include instructions to monitor functions of the streams environment. The stream manager 134 may collect information of tuples, operators, and processing elements of the streams environment. The stream manager 134 may determine operations to be performed on the operator graph depending on the collected information. The fusion manager 140 may collect information of tuples, operators, and processing elements of the streams environment. The fusion manager 140 may fuse operators within the streams environment. The fusion of operators may include removing operators from processing elements, and fusing the operators to other processing elements based on the collected information.

The communications network 120 may include a variety of types of physical communication channels or "links." The links may be wired, wireless, optical, or any other suitable media. In addition, the communications network 120 may include a variety of network hardware and software for performing routing, switching, and other functions, such as routers, switches, or bridges. The communications network 120 may be dedicated for use by a stream computing application or shared with other applications and users. The communications network 120 may be any size. For example, the communications network 120 may include a single local area network or a wide area network spanning a large geographical area, such as the Internet. The links may provide different levels of bandwidth or capacity to transfer data at a particular rate. The bandwidth that a particular link provides may vary depending on a variety of factors, including the type of communication media and whether particular network hardware or software is functioning correctly or at full capacity. In addition, the bandwidth that a particular link provides to a stream computing application may vary if the link is shared with other applications and/or users. The available bandwidth may vary depending on the load placed on the link by the other applications and users. The bandwidth that a particular link provides may also vary depending on a temporal factor, such as time of day, day of week, day of month, or season.

Figure 2:
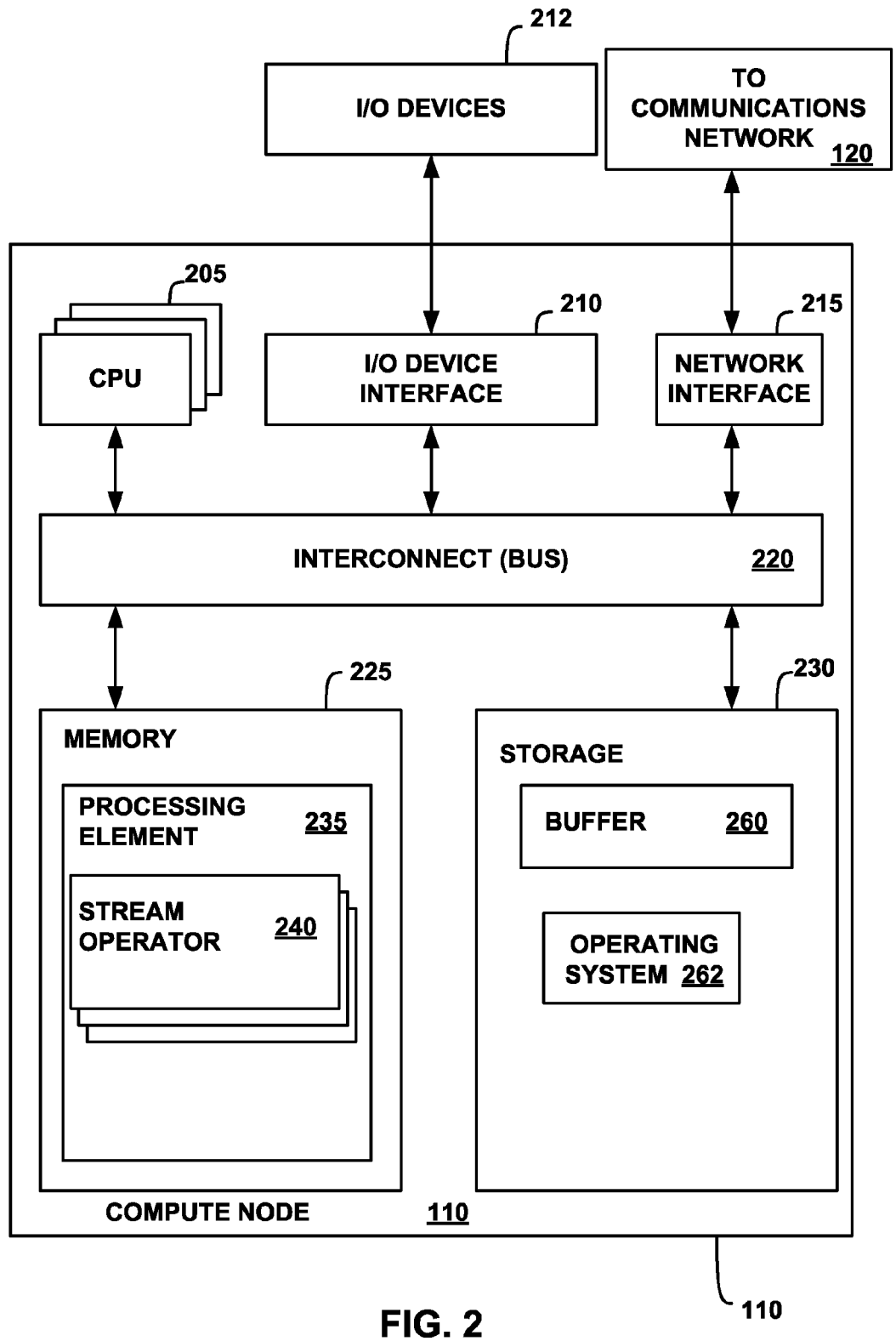
FIG. 2 illustrates a more detailed view of a compute node of FIG. 1, according to various embodiments.

FIG. 2 is a more detailed view of a compute node 110, which may be the same as one of the compute nodes 110A-110D of FIG. 1, according to various embodiments. The compute node 110 may include, without limitation, one or more processors (CPUs) 205, a network interface 215, an interconnect 220, a memory 225, and a storage 230. The compute node 110 may also include an I/O device interface 210 used to connect I/O devices 212, e.g., keyboard, display, stylus, touchscreen, and mouse devices, to the compute node 110.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may include one or more busses. The CPUs 205 may be a single CPU, multiple CPUs, or a single CPU having multiple processing cores, in various embodiments. In one embodiment, a processor 205 may be a digital signal processor (DSP). One or more processing elements 235 (described herein) may be stored in the memory 225. A processing element 235 may include one or more stream operators 240 (described herein). In one embodiment, a processing element 235 is assigned to be executed by only one CPU 205, although in other embodiments the stream operators 240 of a processing element 235 may include one or more threads that are executed on two or more CPUs 205. The memory 225 is generally included to be representative of a random access memory (RAM), e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 215 is configured to transmit data via the communications network 120, according to various embodiments.

A stream computing application may include one or more stream operators 240 that may be compiled into a "processing element" container 235. The memory 225 may include two or more processing elements 235, with each processing element having one or more stream operators 240. Each stream operator 240 may include a portion of code that processes tuples flowing into a processing element. The stream operators can then output the tuples to other stream operators 240 in the same processing element, in other processing elements, or in both the same and other processing elements in a stream computing application. Processing elements 235 may pass tuples to other processing elements that are on the same compute node 110 or on other compute nodes that are accessible via communications network 120. For example, a processing element 235 on compute node 110A may output tuples to a processing element 235 on compute node 110B.

The storage 230 may include a buffer 260. Although shown as being in storage, the buffer 260 may be located in the memory 225 of the compute node 110 or in a combination of both memories. Moreover, storage 230 may include storage space that is external to the compute node 110, such as in a cloud.

The compute node 110 may include one or more operating systems 262. An operating system 262 may be stored partially in memory 225 and partially in storage 230. Alternatively, an operating system may be stored entirely in memory 225 or entirely in storage 230. The operating system provides an interface between various hardware resources, including the CPU 205, and processing elements and other components of the stream computing application. In addition, an operating system provides common services for application programs, such as providing a time function.

Figure 3:
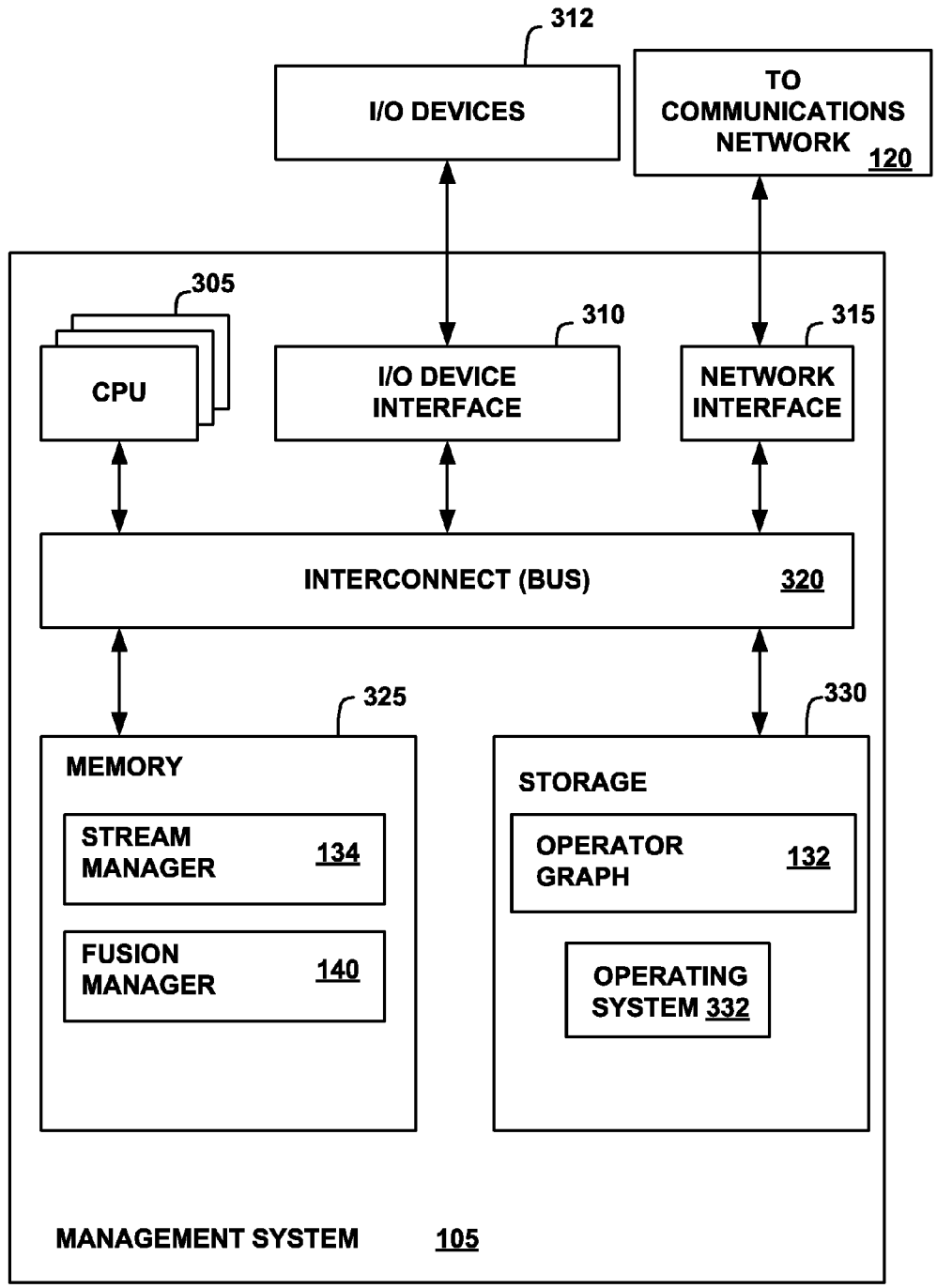
FIG. 3 illustrates a more detailed view of the management system of FIG. 1, according to various embodiments.

FIG. 3 is a more detailed view of the management system 105 of FIG. 1 according to some embodiments. The management system 105 may include, without limitation, one or more processors (CPUs) 305, a network interface 315, an interconnect 320, a memory 325, and a storage 330. The management system 105 may also include an I/O device interface 310 connecting I/O devices 312, e.g., keyboard, display, stylus, touchscreen, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 315, and memory 325. The interconnect 320 may be one or more busses. The CPUs 305 may be a single CPU, multiple CPUs, or a single CPU having multiple processing cores in various embodiments. In one embodiment, a processor 305 may be a DSP. Memory 325 is generally included to be representative of a RAM, e.g., SRAM, DRAM, or Flash. The storage 330 is generally included to be representative of a non-volatile memory, such as a hard disk drive, solid state device (SSD), removable memory cards, optical storage, Flash memory devices, NAS, connections to storage area-network (SAN) devices, or the cloud. The network interface 315 is configured to transmit data via the communications network 120.

The memory 325 may store a stream manager 134. The stream manager 134 may monitor one or more operators operating within the streams environment. The memory 325 may store a fusion manager 140. The fusion manager 140 may monitor the workloads of the operators within the streams environment. The operators can be combined into processing elements, which may accept tuples, and allow the operators to perform operations on the tuples. The fusion manager 140 may determine if operators can be fused to combine one or more operators into a processing element. Additionally, the storage 330 may store an operator graph 132. The operator graph 132 may define how tuples are routed to processing elements 235 (FIG. 2) for processing.

The management system 105 may include one or more operating systems 332. An operating system 332 may be stored partially in memory 325 and partially in storage 330. Alternatively, an operating system may be stored entirely in memory 325 or entirely in storage 330. The operating system provides an interface between various hardware resources, including the CPU 305, and processing elements and other components of the stream computing application. In addition, an operating system provides common services for application programs, such as providing a time function.

Figure 4:
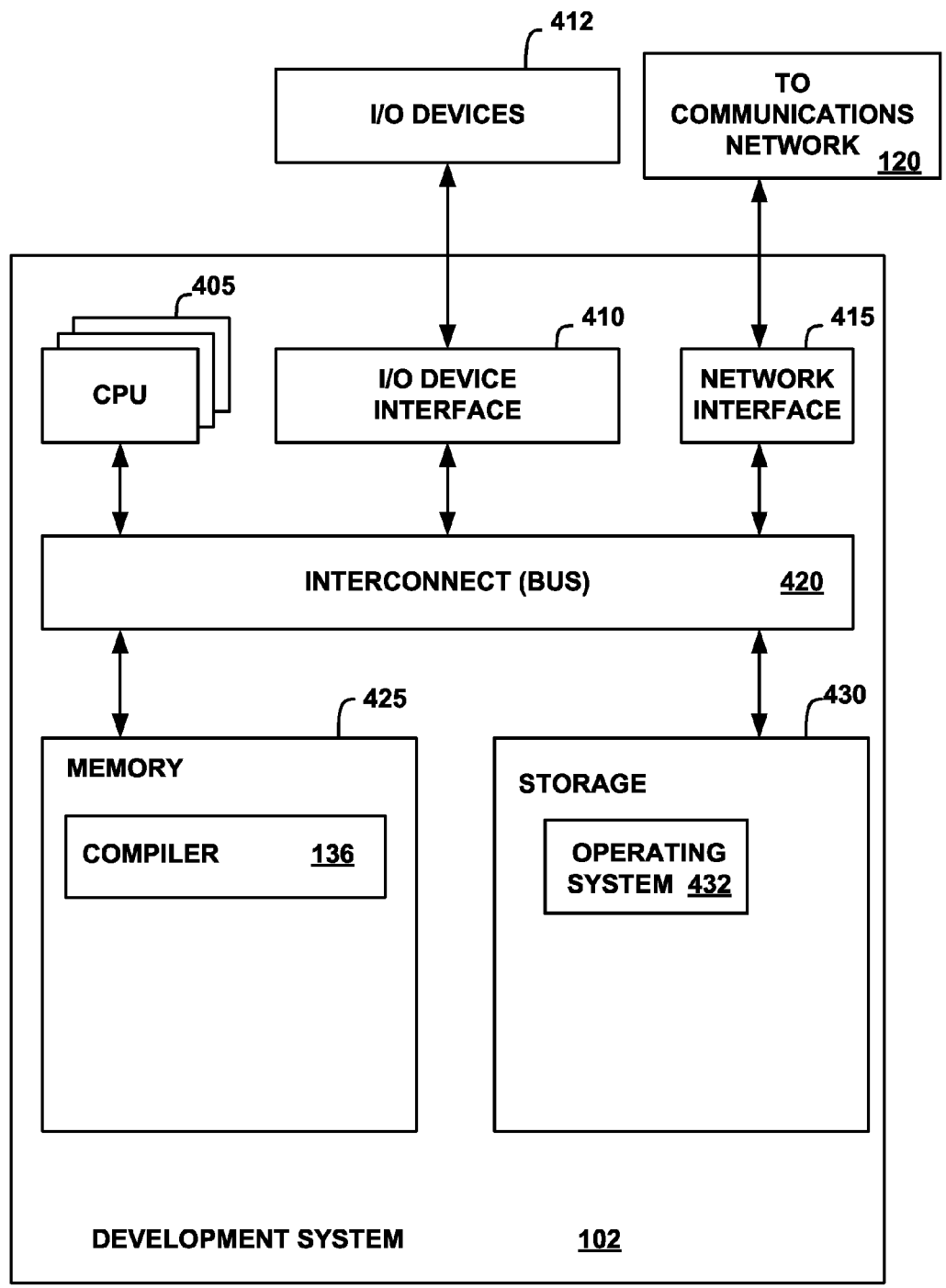
FIG. 4 illustrates a more detailed view of the development system of FIG. 1, according to various embodiments.

FIG. 4 is a more detailed view of the development system 102 of FIG. 1 according to some embodiments. The development system 102 may include, without limitation, one or more processors (CPUs) 405, a network interface 415, an interconnect 420, a memory 425, and storage 430. The development system 102 may also include an I/O device interface 410 connecting I/O devices 412, e.g., keyboard, display, stylus, touchscreen, and mouse devices, to the development system 102.

Each CPU 405 retrieves and executes programming instructions stored in the memory 425 or storage 430. Similarly, each CPU 405 stores and retrieves application data residing in the memory 425 or storage 430. The interconnect 420 is used to move data, such as programming instructions and application data, between the CPU 405, I/O device interface 410, storage unit 430, network interface 415, and memory 425. The interconnect 420 may be one or more busses. The CPUs 405 may be a single CPU, multiple CPUs, or a single CPU having multiple processing cores in various embodiments. In one embodiment, a processor 405 may be a DSP. Memory 425 is generally included to be representative of a RAM, e.g., SRAM, DRAM, or Flash. The storage 430 is generally included to be representative of a non-volatile memory, such as a hard disk drive, solid state device (SSD), removable memory cards, optical storage, flash memory devices, network attached storage (NAS), connections to storage area-network (SAN) devices, or to the cloud. The network interface 415 is configured to transmit data via the communications network 120.

The development system 102 may include one or more operating systems 432. An operating system 432 may be stored partially in memory 425 and partially in storage 430. Alternatively, an operating system may be stored entirely in memory 425 or entirely in storage 430. The operating system provides an interface between various hardware resources, including the CPU 405, and processing elements and other components of the stream computing application. In addition, an operating system provides common services for application programs, such as providing a time function.

The memory 425 may store a compiler 136. The compiler 136 compiles modules, which include source code or statements, into the object code, which includes machine instructions that execute on a processor. In one embodiment, the compiler 136 may translate the modules into an intermediate form before translating the intermediate form into object code. The compiler 136 may output a set of deployable artifacts that may include a set of processing elements and an application description language file (ADL file), which is a configuration file that describes the stream computing application. In some embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both. The output of the compiler 136 may be represented by an operator graph, e.g., the operator graph 132.

The compiler 136 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators may balance the benefits of distributing processing across multiple compute nodes with the benefit of faster inter-operator communications. The compiler 136 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Figure 5:
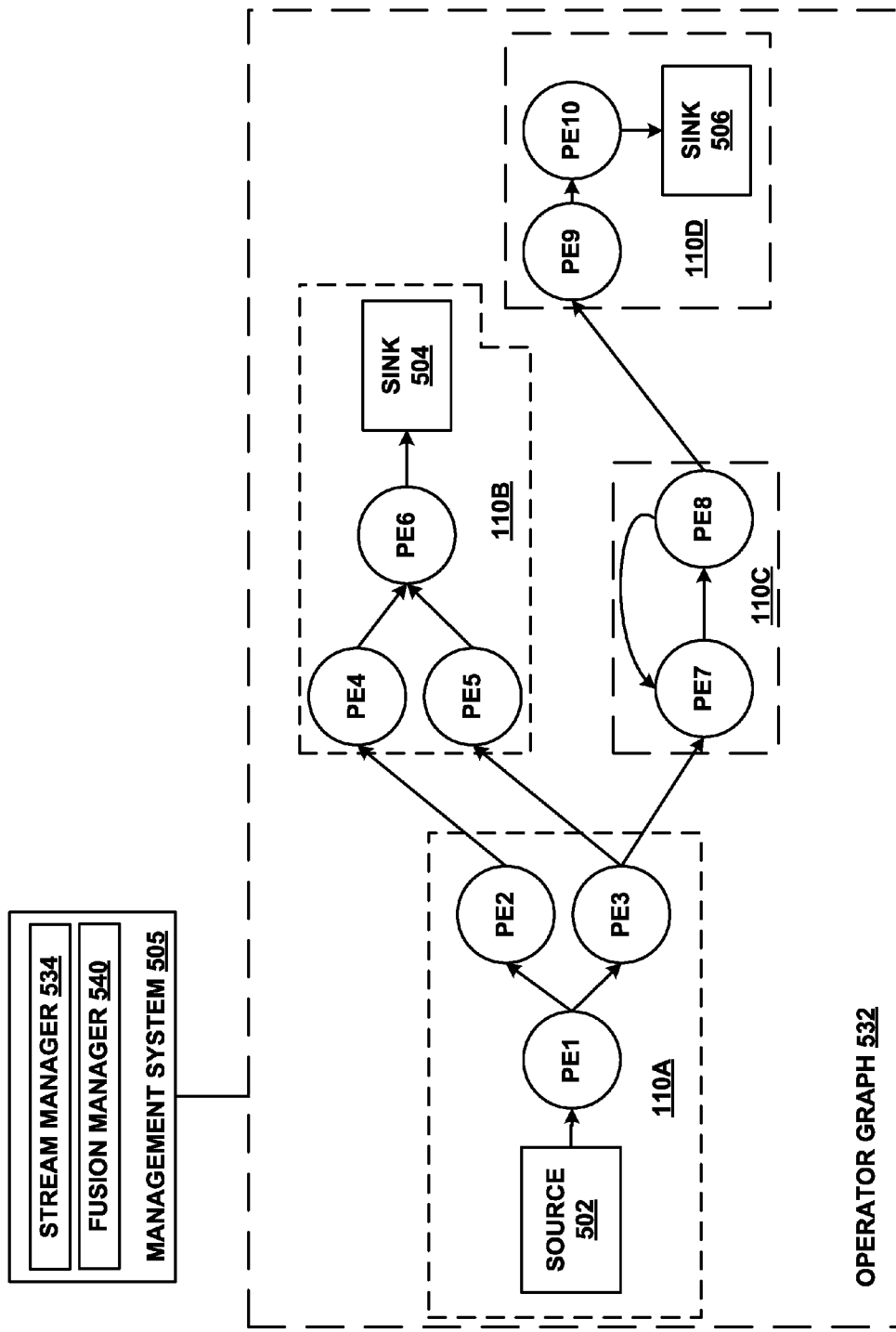
FIG. 5 illustrates an operator graph for a stream computing application, according to various embodiments.

FIG. 5 illustrates an operator graph 532 for a stream computing application beginning from a source 502 through to one or more sinks 504, 506, according to some embodiments. This flow from source 502 to the one or more sinks may also be generally referred to herein as an execution path. In addition, a flow from one processing element to another may be referred to as an execution path in various contexts. Although FIG. 5 is abstracted to show connected processing elements PE1-PE10, the operator graph 532 may include data flows between stream operators 240 (FIG. 2) within the same or different processing elements. Typically, processing elements, such as processing element 235 (FIG. 2), receive tuples from the stream as well as output tuples into the stream (except for a sink—where the stream terminates, or a source 502—where the stream begins). While the operator graph 532 includes a relatively small number of components, an operator graph 532 may be much more complex and may include many individual operator graphs that may be statically or dynamically linked together.

The example operator graph 532 may be managed by a management system 505. The management system 505 may include a stream manager 534, and a fusion manager 540. The stream manager 534 may perform functions on the stream environment. Functions that the stream manager 534 performs may include monitoring, recording, altering, and other various functions on the streams environment and the tuples. The stream manager 534 may function along with or be commutatively coupled to the fusion manager 540. The fusion manager 540 may perform functions on the processing elements and the operators within the operator graph 532. The fusion manager may monitor the streams environment, measure a workload of the operators and the processing elements, determine thresholds of the workload, determine fusion compatibilities of operators, and fuse operators together on a processing element.

The example operator graph 532 shown in FIG. 5 includes ten processing elements (labeled as PE1-PE10) running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. Inter-process communication paths used for inter-process communications may be a critical resource in a stream computing application. However, when stream operators are fused together, the fused stream operators may use more rapid communication techniques for passing tuples among stream operators in each processing element.

The operator graph 532 begins at a source 502 and ends at a sink 504, 506. Compute node 110A includes the processing elements PE1, PE2, and PE3. Source 502 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Tuples that flow to PE2 are processed by the stream operators contained in PE2, and the resulting tuples are then output to PE4 on compute node 110B. Likewise, the tuples output by PE4 flow to operator sink PE6 504. Similarly, tuples flowing from PE3 to PE5 also reach the operators in sink PE6 504. Thus, in addition to being a sink for this example operator graph 532, PE6 could be configured to perform a join operation, combining tuples received from PE4 and PE5. This example operator graph 532 also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by operators in a sink processing element, for example PE10 506.

Processing elements 235 (FIG. 2) may be configured to receive or output tuples in various formats, e.g., the processing elements or stream operators could exchange data marked up as XML documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 534 of FIG. 1 may be configured to monitor a stream computing application running on compute nodes, e.g., compute nodes 110A-110D, as well as to change the deployment of an operator graph 532. The stream manager 134 may move processing elements from one compute node 110 to another, for example, to manage the processing loads of the compute nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110A-110D.

Because a processing element may be a collection of fused stream operators, it is equally correct to describe the operator graph as one or more execution paths between specific stream operators. The processing elements may include one or more stream operators operating within the processing element. The processing elements may include execution paths to different stream operators within the same processing element. According to FIG. 5, an embodiment illustrates execution paths between processing elements for the sake of clarity.

FIGS. 6A and 6B illustrate the fusion of two processing elements into a single processing element. A streams environment operates as tuples move within an operator graph situated to perform a series of operations. The series of operations may be combined to form an application based upon the use of the streams environment. The fusion of the two processing elements may be determined by the programming instructions within the code of the operators.

In FIG. 6A a streams environment of one or more operators is illustrated. The streams environment may include one or more operators that may include a source 610, and sink 612. Between the source 610 and the sink 612, one or more processing elements are ordered including a first processing element (PE1) 631, a second processing element (PE2) 632, a third processing element (PE3) 633, a fourth processing element (PE4) 634, and a fifth processing element (PE5) 635. The five processing elements may include one or more operators performing operations upon a stream of tuples passing though the operator graph from the source 610 to the sink 612.

A fusion manager 650 may be used to determine if one of the five processing elements may be fused. For a processing element to be fused with another processing element the programming instructions, of each of the one or more operators within each of the two or more processing elements, may include the language allowing the processing elements to be fused. For example, if the programming instructions of the one or more operators within the PE3 633 and the one or more operators within the PE4 634 contain the programming instructions to be fused, then the PE3 and PE4 may be fused.

In FIG. 6B, a streams environment of a plurality of operators is illustrated after fusion of the plurality of operators of two processing elements. The fusion manager 650 fused the two processing elements PE3 and the PE4 (FIG. 6A) into a single sixth processing element (PE6) 636. The fusion of the PE3 and the PE4 into PE6 636 may include taking the plurality of operators of PE3 and the plurality of operators of PE4 and combining the operators into a single processing element the PE6 636. The other three processing elements the PE1 631, the PE2 632, and the PE5 635 may remain the same after combining the PE3 and the PE4. For example, the PE3 may contain three operators and the PE4 may contain two operators. The programming instructions of the three operators of the PE3 and the two operators of PE4 may include language instructing the fusion manager 650 to which operators the monitored operator may fuse. If all three of the operators within the PE3 may fuse with the two operators of the PE4, then the operators may fuse to create the PE6 636 with five operators.

In various embodiments, the five operators of the PE6 636 may be later determined to overload the PE6 and a plurality of the operators five operators may need to be fused with another processing element. The plurality of operators of the five operators can be distributed and fused to another processing element within the operator graph. If one operator of the five operators within PE6 636 needs to be distributed and fused with another processing element, the operator can be compared to all of the operators within the PE1 631, PE2 632, and PE5 635. If more than one of the processing elements are able to fuse with the operator, then the optimal processing element is selected by the fusion manager 650. For example, if PE1 631 and PE5 635 are able to accept the operator from PE6 636, then the fusion manager 650 may select the optimal processing element. The optimal processing element may include a processing element with the higher available processing power, or a processing element that has a similar operator to the operator to be fused. The fusion manager 650 may fuse the operator to the PE5 635 upon the determination that the PE5 is the optimal processing unit when compared to PE1 631.

In various embodiments, the operators of the PE3 and the PE4 may be distributed between other operators instead of being combined together into PE6 636. The distribution of the operators within the PE3 and the PE4 may require the operators to be determined, by the fusion manager 650, if the operators can fuse with the other processing elements. If the operators are able to fuse with a processing element within the operator graph, then the fusion manager 650 may fuse the operator to the processing element. If the operators are not able to fuse with another processing element within the operator graph, then the fusion manager 650 may create a new processing element for the operators. For example, the operators within the PE3 and the PE4 may include five operators. Of the five operators two of the operators may fuse with PE1 631, one operator may fuse with PE5 635, and two of the operators may not be able to fuse with any of the processing elements. The two operators that were unable to fuse with PE1 631, PE2 632, and PE5 635 may fuse together to create a new sixth processing element PE6 636.

In various embodiments, the workloads of the processing elements may be monitored by the fusion manager 650. The monitoring may include determining if the workload of the processing elements being overloaded or underloaded. If the workload of one of the processing elements within the operator graph are overloaded or underloaded, then the fusion manager 650 may distribute an operator from one of the processing elements to another. For example, if the workload of a PE1 631 is overloaded, then the fusion manager 650 may distribute plurality of operators from the PE1 631 to another processing element. The plurality of operators to be distributed can be determined by the fusion manager 650 based on the programming instructions of the plurality of operators. The plurality of operators to be distributed can be determined by the fusion manager 650 by the workload associated with that operator within the PE1 631. The fusion manager 650 may select the plurality of operators to distribute to another processing element and fuse the plurality of operators with another processing element. For example, the processing element to be fused may be PE2 632. The fusion manager 650 can de-couple the plurality of operators to be fused from PE1 631, and fuse the plurality of operators with PE2.

Figure 7A:
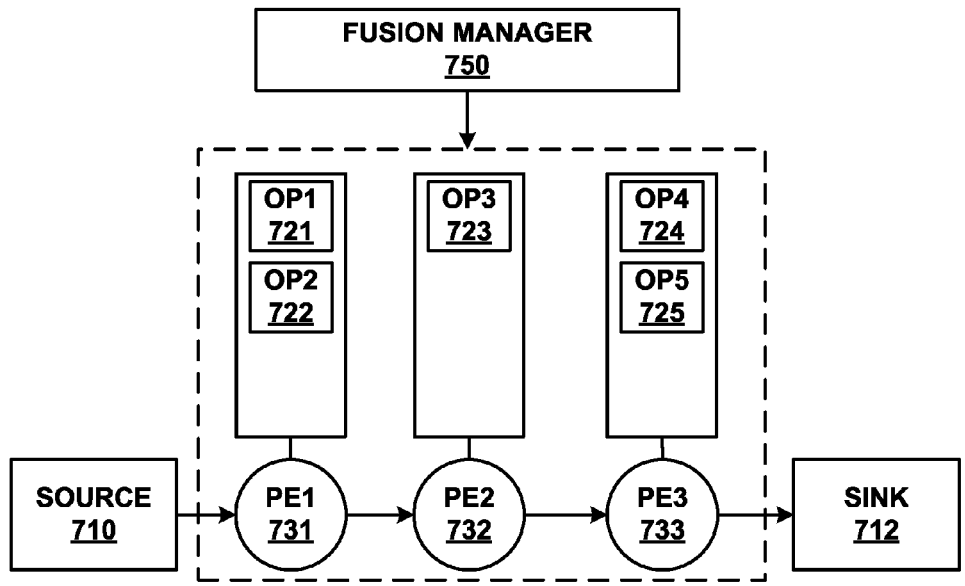
FIG. 7A illustrates an operator graph with three processing elements including operators associated with the processing elements, according to various embodiments.
Figure 7B:
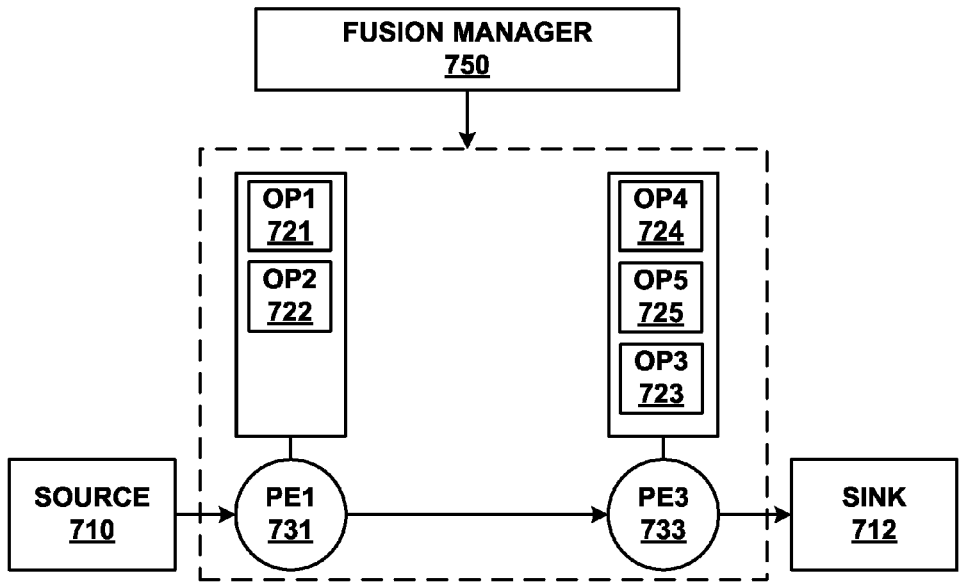
FIG. 7B illustrates an operator graph where two processing elements have been fused by a distribution of operators, according to various embodiments.

FIGS. 7A and 7B, illustrate the fusion of two processing elements by removing an operator from a processing element and fusing the operator with another processing element. A streams environment operates as tuples move within an operator graph situated to perform a series of operations. The series of operations may be combined to form an application based upon the use of the streams environment.

In FIG. 7A, illustrated is three processing elements each with plurality of operators positioned between a source and a sink. The source 710 reads data from a first storage medium and sends the data in the form of tuples into the streams environment to be processed by the three processing elements within the operator graph. The sink 712 receives tuples that have been processed by the three processing elements and writes the tuples in the form of data onto a second storage medium. The three processing elements may include a first processing element (PE1) 731, a second processing element (PE2) 732, and a third processing element (PE3) 733. A fusion manager 750 may monitor the three processing elements as tuples pass through the processing elements from the source 710 to the sink 712.

The three processing elements may include a plurality of operators that perform operations upon tuples as they pass through the processing element. The PE1 731 includes two operators a first operator (OP1) 721, and a second operator (OP2) 722. The PE2 732 includes on operator a third operator (OP3) 723. The PE3 733 includes two operators a fourth operator (OP4) 724, and a fifth operator (OP5) 725. Each of the operators may perform an operation on each tuple entering the processing element. Once each of the plurality of operators performs an operation on the tuple within the processing element, the tuple may move to the next processing element within the operator graph until the tuple reaches the sink 712. For example, the PE1 731 may receive a tuple from the source. The PE1 731 may contain OP1 721 and OP2 722 performs their respective operations upon the tuple. The OP1 721 may perform an operation on the tuple, and then OP2 722 may perform an operation on the tuple. The OP2 722 may perform an operation on the tuple, and then OP1 721 may perform an operation on the tuple. The OP1 721 and OP2 722 may both perform operations upon the tuple simultaneously on the tuple. After both of the operations of OP1 721 and OP2 722 are performed on the tuple, the PE1 731 may send the tuple to PE2 732 to perform operations upon the tuple.

A fusion manager 750 may monitor the operator graph as the tuples pass through the processing elements including PE1 731, the PE2 732, and the PE3 733. The fusion manager 750 may monitor for the workloads of the processing elements and determine if the workloads of the processing elements are overloaded or underloaded. For example, the fusion manager 750 may determine that workload of the PE2 732 containing OP3 723 is underloaded. The fusion manager 750 may look at the programming instructions of other operators within the streams environment and determine which processing element the operator may fuse. The programming instructions of OP3 723 can be compared to the programming instructions of the OP1 721, the OP2 722, the OP4 724, and the OP5 725. If the OP3 723 is not able to fuse with the OP1 721, or the OP2 722, then the OP3 may not be able to fuse with PE1 731. If the OP3 723 is able to fuse with OP4 724, and OP5 725, then the OP3 may be fused with PE3 733.

In FIG. 7B, illustrated is a fusion of an operator from a second processing element to a third processing element. The second processing element (PE2) (FIG. 7A) has been de-coupled from the stream environment and the third operator (OP3) 723 that was contained within PE2 has been fused with a third processing element (PE3) 733. Now within the streams environment, according to an embodiment, two processing elements are operating on tuples as they pass from the source 710 to the sink 712.

After the OP3 723 has fused with the PE3 733, a fusion manager 750 may monitor the workload of the processing elements within the streams environment. After fusing an operator from a processing element with a new processing element the workload of both of the processing elements may change. For example, the PE3 733 has fused the OP3 723 alongside the OP4 724 and the OP5 725. The increase in the number of operators within the PE3 733 may increase the workload of PE3 when compared to before fusing the OP3 723 to the PE3. Since all of operators from the PE2 were de-coupled and fused with PE3 733, PE2 may be removed from the operator graph, reducing the workload of PE2. The workload of PE2, when removed, may be zero, possibly removing the need for the computer processor to be running the PE2. When the computer processor running the PE2 is no longer needed, the computer processor may be used for another task.

In various embodiments, the OP3 723 may fuse with either the PE1 731 or the PE3 733. If both the PE1 731 and the PE3 733 are able to fuse OP3 723, then the optimal processing element may be chosen to fuse with OP3. The optimal processing element may be determined by the fusion manager 750. The optimal processing element may be determined by comparing the workloads of the PE1 731 and the PE3 733. The optimal processing element may also be determined based on the configuration of the operator graph.

The fusion manager 750 can determine, according to various embodiments, which processing element has a lower workload when compared to the other processing elements. For example, the PE3 732 may have a lower workload when compared to the PE1 731 and OP3 723 may be fused with the PE3. The optimal processing element may be determined by which processing element has the most related operators. For example, if neither the OP1 721 nor the OP2 722 of the PE1 731 are related to the OP3 723, then OP3 may not fuse with PE1. If the OP4 724 of the PE3 733 is related to the OP3 723, then as long as the OP5 725 of the PE3 733 is able to fuse alongside the OP3 723, then the OP3 may fuse with the PE3 733.

In various embodiments, the fusion manager 750 may also monitor stored historical information of previous runs of the streams environment. When determining the fusion of an operator, the fusion manager 750 may need to decide between two or more other processing elements. The stored historical information may be used to determine with which processing element to fuse the operator. For example, the stored historical information may be used to determine if running two processing elements with similar operators may waste computational power. For example, if OP3 723 is similar to OP4 724, then may be advantageous to fuse OP3 with the PE3 733 as long as the OP5 725 is able to fuse with OP3.

Figure 8:
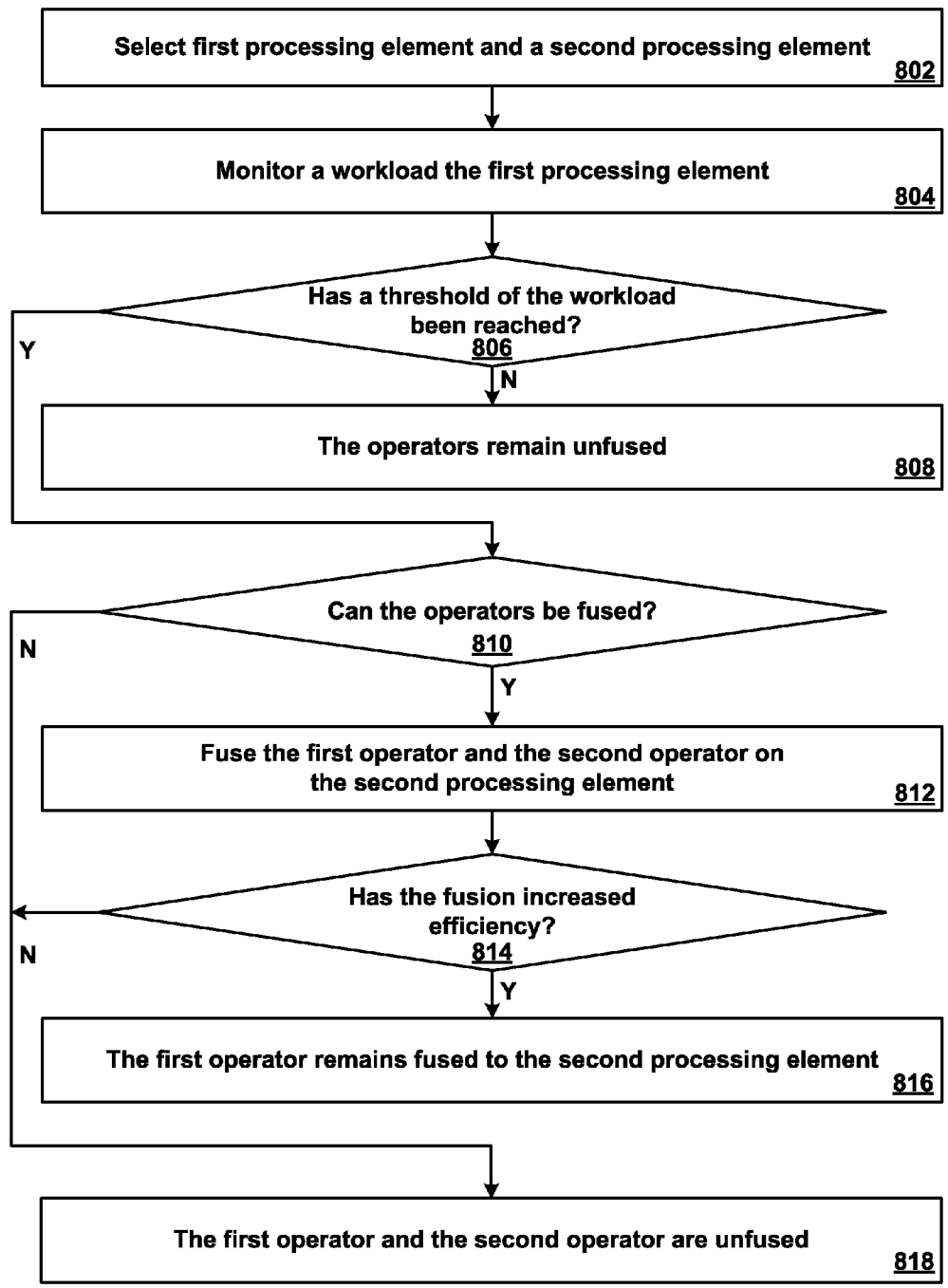
FIG. 8 illustrates a flowchart determining the fusion of a first operator and a second operator onto a single processing element, according to various embodiments.

In FIG. 8 illustrated is a flowchart of the fusion of an operator from one processing element to another processing element. The operator may be transferred from a first processing element to a second processing element with a plurality of operators, and fused with the second processing element. For the operator to be fused with the second processing element, each of the plurality of operators within the second processing element may have to be able to fuse with the operator. For example, a first processing element may be coupled with a first operator, and a second processing element be coupled with contain a second operator.

In operation 802, a first processing element and a second processing element are selected. The first processing element may contain a first operator coupled with the first processing element. The second processing element may contain a second operator coupled with the second processing element.

In operation 804, a computer processor consumption or workload of the first processing element is monitored. A workload of the second processing element may be monitored. The monitoring of the workload of the first processing element and the second processing element may be measured and recorded by a fusion manager. To measure the workload of the first processing element and the second processing element the fusion manager may measure the workload or consumption of a computer processor. For example, the fusion manager may measure the workload of a first processing element, and the workload of a second processing element. The workload of the first processing element may include the workload of a first operator within the first processing element. The workload of the second processing element may include the workload of a second operator within the second processing element.

In operation 806, a threshold of a workload of computer processors that the first operator and the second operator are operating upon is determined. The threshold may include an upper threshold or a lower threshold of the workload of the computer processors. The upper threshold and the lower threshold may be used to determine if a computer processor is overloaded or underloaded. If the computer processor is not overloaded or underloaded, then the fusion may not be and the flowchart may progress to operation 808. The thresholds may be adjustable. The threshold may be used to inform a user that the processing element is overloaded or underloaded. If the workload of the first processing element has reached a threshold, then the flowchart may process to operation 810. For example, the first operator of a first processing element may be operating on a first computer processor. If the workload of the first computer processor reaches a threshold, then the threshold may be a first threshold. The first threshold may be determined by a fusion manager. The fusion manager may process the flowchart to operation 810, which sends instructions on how to fuse the operators.

If a processor containing a processing element with an operator is overloaded, then the processing element may attempt to fuse an operator within the processing element to another processing element. For example, a first processing element has a first operator. The workload of the first processing element may be overloaded, causing the workload of the first processing element to reach a first threshold. The first operator of the first processing element may be de-coupled and fused to a second processing element to reduce the workload of the first processing element.

If a processor with a processing element is underloaded, then an operator of another processing element may be de-coupled and fused with the processing element of the processor. For example, a first processing element has a first operator and a second processing element has a second processing element. The workload of the first processing element may be underloaded, causing the workload of the first processing element to reach a first threshold. The second operator of the second processing element may be de-coupled and fused to the first processing element to increase the workload of the first processing element.

In various embodiments, the operators may be fused on the determination that the fusion may increase a workload efficiency even if the first threshold has not been reached. If the first threshold has not been reached but the workload efficiency may be increased, then the first processing element may be fused with the second processing element.

In operation 808, the operators remain unfused. If the first threshold has not been reached by the processing element, then the operators remain unfused. For example, if the first processing element has not reached the threshold, then a first operator of the first processing element may not be fused to another processing element.

In operation 810, the fusion of a first operator within the first processing element and a second operator within the second processing element is determined. To determine if the first operator and the second operator may be fused, programming instructions may be used. The programming instructions of the first operator and the programming instructions of the second operator may be compared to determine if the operators may be fused. The programming instructions of the first operator may include fusion instructions of the first operator. The programming instructions of the second operator may include fusion instructions of the second operator. If the programming instructions of the first operator and the programming instructions of the second operator may determine that the first operator may be fused with the second operator, then the flowchart may progress to operation 812. The programming instructions of the first operator and the programming instructions of the second operator may determine that the first operator and the second operator are in a same class. The class may include a type of operator. If the programming instructions of the first operator and the programming instructions of the second operator may determine that the first operator may not be fused with the second operator, then the flowchart may progress to operation 818.

In various embodiments, the second processing element may contain more than one operator that determines if the first operator and the second operator may fuse. For example, the second processing element may contain a third operator. The third operator may include programming instructions that may include the fusion instructions of the third operator. If the programming instructions of the first operator and the third operator may determine that the first operator may not be fused with the third operator, then the flow chart may progress to operation 818. Even if the programming instructions of the first operator and the programming instructions of the second operator determine that the first operator and the second operator may be fused, the programming instructions of the third operator included within the second processing element may prevent the first operator and the second operator from fusing.

In operation 812, the fusion manager may fuse the first operator with the second operator. The first operator may be fused with the second operator on the second processing element. The second processing element may receive the first operator from the first processing element and fuse the first operator with the second operator. The fusion may include the first operator and the second operator performing independent operations on tuples as they are within the second processing element. For example, a tuple may enter the second processing element. The tuple enters the processing element, the first operator and the second operator perform operations on the tuple, and the tuple exits the second processing element.

In various embodiments, the first operator and the second operator may be fused on the first processing element. The first processing element may receive the second operator from the second processing element and fuse the first operator with the second operator.

In various embodiments, the fusion of the first operator and the second operator on the second processing element requires a pause of the streams environment. For example, if the first operator is to be de-coupled from the first processing element, the tuple flow entering the first processing element may need to be paused to prevent tuples from not being processed by the first operator before the first operator is moved to the second processing element. A pause may include holding tuples from entering a processing element that has the pause placed before. If the first processing element is located upstream of the second processing element, then the pause can be placed before the first processing element. If the second processing element is located upstream of the first processing element, then the pause can be placed before the second processing element. The pausing of the tuple flow may be maintained until the first operator is de-coupled from the first processing element, and fused with the second processing element. After the first operator is fused with the second processing element, the pause may be removed and the tuple flow may be restored.

In operation 814, workload is monitored of the first processing element and the second processing element and the workload may be used to determine if the fusion has increased the efficiency of the first processing element and the second processing element. The efficiency may include the workload efficiency. Workload efficiency may be determined by the computational power required or computer process consumption of the workload. A computer processor consumption or workload of the first processing element and the workload of the second processing element may be used to determine if the fusion of the first operator and the second operator increased or decreased the efficiency of the streams environment. Increasing or decreasing the efficiency of the streams environment may include the efficiency of the first processing element, the second processing element, or the streams environment as a whole. For example, if adding the workload of the first operator increased the workload of the second processing element but did not overload the workload of the second processing element, then the fusion may have increased the efficiency of the second processing element. The fusion may also decrease the workload of the first processing element; if the fusion does not under load the workload of the first processing element, then the fusion may have increased the efficiency of the streams environment as a whole. If the fusion increases the efficiency of the streams environment, then the flowchart may progress to operation 816. In another example, if adding the workload of the first operator to the second processing element overloads the workload of the second processing element, then the fusion may have decreased the workload efficiency of the second processing element. If the fusion decreases the efficiency of the second processing element, then the flow chart may progress to operation 818.

In various embodiments, the fusion may increase the efficiency of the first processing element, but decrease the efficiency of the second processing element. For example, the fusion may prevent the first operator from overloading the first processing element, but the fusion causes the second processing element to be overloaded. The fusion manager may choose which processing element is the least overloaded when fused with the first processing element. For example, if the first processing element with the first operator is 10% overloaded and the fusion of the first operator causes the second processing element to be 5% overloaded, then the fusion manager may fuse the operator with the second processing element.

In various embodiments, the removal of the first operator from the first processing element may include removing all of the operators within the first processing element. If all of the operators within the first processing element are de-coupled, then the workload first processing element may be zero. Since the workload is zero the underloaded workload determination is not considered when determining if more operators should be fused with the first processing element. If the workload of the first processing element is zero, then the processing element may be removed from the streams environment.

In various embodiments, determining the efficiency may include a threshold of the workload of the computer processors. The threshold may include an upper threshold or a lower threshold of the workload of the computer processors. The upper threshold and the lower threshold may be used to determine if a computer processor is overloaded or underloaded. If the computer processor is overloaded or underloaded, then the fusion may have not increased the efficiency of the computer processor and the flowchart may progress to operation 818. For example, the fusion of the first operator and the second operator on the second processing element may cause a computer processor the second processing element is operating on to be overloaded. If the computer processor becomes overloaded by reaching the upper threshold, then the threshold may include a second threshold of the workload. If the second threshold of the workload has been reached, then the fusion may have not increased the efficiency. If the fusion has not increased the efficiency, then the first operator and the second operator may be unfused in operation 818.

In operation 816, the first operator remains fused with the second operator on the second processing element. The determination of the fusion first operator with the second processing element increasing the efficiency of the streams environment may result in the fusion.

In operation 818, the first operator is unfused with the second operator on the second processing element. The determination of the fusion first operator with the second processing element decreasing the efficiency of the streams environment may result in the fusion being reverted or unfused. The first operator may be fused with the first processing element to return the streams environment to the original configuration.

In various embodiments, the fusion operation 808 may be tested in a test streams environment. A copy of the operator graph of the actual streams environment being monitored by the fusion manager may be copied and tested to determine if the fusion of the first operator to the second processing element will increase the efficiency of the test streams environment. The testing may proceed within the test streams environment as within the flow chart, but the fusion within the operator graph may not occur unless the test streams environment determines that the fusion increases the efficiency of the tested streams environment. In operation 812, the tested streams environment may apply the fusion in the operator graph to conclude the tested streams environment. For example, a test streams environment may be created as a copy of the operator graph of the actual streams environment. The copy may be tested using a previous run performed upon the streams environment. If the fusion of the first operator to the second operator within the second processing element increases the efficiency of the tested streams environment, then the first operator can be fused with second operator within the operator graph of the actual streams environment.

The present invention may be a system, a method, and/or a computer program product. The computer program product may include a computer readable storage medium (or media) having computer readable program instructions thereon for causing a processor to carry out aspects of the present invention.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

What is claimed is:

1. A system for fusing operators within a streams environment, comprising:
   a processor; and
   a memory communicatively coupled to the processor, wherein the memory comprises instructions which, when executed by the processor, cause the processor to:
      monitor a streams environment including a plurality of processing elements operating upon one or more computer processors, wherein the plurality of processing elements include:
         a first processing element coupled with a first operator which is instructed by a first programming instructions, and
         a second processing element coupled with a second operator which is instructed by a second programming instructions;
      measure a workload of the first processing element;
      measure a workload of the second processing element;
      determine if the workload of the first processing element has reached a first threshold of the workload of the first processing element;
      determine if the workload of the second processing element has reached a second threshold of the workload of the second processing element;
      compare the first programming instructions and the second programming instructions to determine whether the first programming instructions and the second programming instructions are compatible, wherein the first operator and the second operator are susceptible to fusion when it is determined that the first programming instructions and the second programming instructions are compatible; and
      in response to a determination that the workload of the first processing element has reached the first threshold and the workload of the second processing element has reached the second threshold and a determination that the first operator and the second operator are susceptible to fusion:
         de-couple the first operator from the first processing element, and fuse, the first operator to the second processing element.

2. The system of claim 1, wherein the first threshold of the workload of the first processing element is a lower threshold of the workload.

3. The system of claim 1, wherein the system is configured to:
   determine if the workload of the first operator causes a workload of the second processing element to reach a third threshold of the workload; and
   unfuse, in response to the third threshold of the workload, the first operator from the second processing element.

4. The system of claim 1, wherein the system is further configured to:
   determine, in response to the workload of the first processing element reaching the first threshold, a pause;
   pause one or more tuples from entering the streams environment;
   de-couple the first operator from the first processing element;
   fuse the first operator with the second processing element; and
   remove, in response to the fusing, the pause.

5. The system of claim 1, wherein the programming instructions of the first operator include instructions on fusing with the second operator.

6. The system of claim 1, wherein the workload of the first processing element includes runtime statistics of the first operator.

7. The system of claim 6, wherein the runtime statistics further configure the system to:
   gather historical information of tuple flow within the first operator; and
   display a fusion of the first operator with the second processing element.

8. The system of claim 1, wherein the programming instructions of the first operator include a designation of a class of the first operator and the programming instructions of the second operator include a designation of a class of the second operator.

9. The system of claim 8, wherein the comparing of the first programming instructions and the second programming instructions to determine whether the first programming instructions and the second programming instructions are compatible includes comparing the class of the first operator and the class of the second operator.

10. A computer program product for fusing operators within a streams environment comprising a computer readable storage medium having a computer readable program stored therein, wherein the computer readable program, when executed on a computing device, causes the computing device to:
   monitor a streams environment including a plurality of processing elements operating upon one or more computer processors, wherein the plurality of processing elements include:
      a first processing element coupled with a first operator which is instructed by a first programming instructions, and
      a second processing element coupled with a second operator which is instructed by a second programming instructions;

measure a workload of the first processing element;
measure a workload of the second processing element;
determine if the workload of the first processing element has reached a first threshold of the workload of the first processing element;
determine if the workload of the second processing element has reached a second threshold of the workload of the second processing element;
compare the first programming instructions and the second programming instructions to determine whether the first programming instructions and the second programming instructions are compatible, wherein the first operator and the second operator are susceptible to fusion when it is determined that the first programming instructions and the second programming instructions are compatible; and
in response to a determination that the workload of the first processing element has reached the first threshold and the workload of the second processing element has reached the second threshold and a determination that the first operator and the second operator are susceptible to fusion:
de-couple the first operator from the first processing element, and
fuse, the first operator to the second processing element.

11. The computer program product of claim 10, wherein the first threshold of the workload of the first processing element is a lower threshold of the workload.

12. The computer program product of claim 10, wherein the computer readable instructions cause the computer to:
determine if the workload of the first operator causes a workload of the second processing element to reach a third threshold of the workload; and
unfuse, in response to the third threshold of the workload, the first operator from the second processing element.

13. The computer program product of claim 10, wherein the computer readable instructions cause the computer to:
determine, in response to the workload of the first processing element reaching the first threshold, a pause;
pause one or more tuples from entering the streams environment;
de-couple the first operator from the first processing element;
fuse the first operator with the second processing element; and
remove, in response to the fusing, the pause.

14. The computer program product of claim 10, wherein the programming instructions of the first operator include instructions on fusing with the second operator.

15. The computer program product of claim 10, wherein the programming instructions of the first operator include a designation of a class of the first operator and the programming instructions of the second operator include a designation of a class of the second operator.

16. The computer program product of claim 15, wherein the comparing of the first programming instructions and the second programming instructions to determine whether the first programming instructions and the second programming instructions are compatible includes comparing the class of the first operator and the class of the second operator.

* * * * *